US009705799B2

United States Patent
Kotalwar et al.

(10) Patent No.: US 9,705,799 B2
(45) Date of Patent: Jul. 11, 2017

(54) SERVER-SIDE LOAD BALANCING USING PARENT-CHILD LINK AGGREGATION GROUPS

(71) Applicants: Jayant Kotalwar, Sunnyvale, CA (US); Venugopal Hemige, Union City, CA (US)

(72) Inventors: Jayant Kotalwar, Sunnyvale, CA (US); Venugopal Hemige, Union City, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 651 days.

(21) Appl. No.: 13/718,379

(22) Filed: Dec. 18, 2012

(65) Prior Publication Data

US 2013/0107885 A1 May 2, 2013

Related U.S. Application Data

(63) Continuation of application No. 12/545,680, filed on Aug. 21, 2009, now Pat. No. 8,369,332.

(51) Int. Cl.
*H04L 12/28* (2006.01)
*H04L 12/803* (2013.01)
*H04L 12/701* (2013.01)
*H04L 12/761* (2013.01)
*H04L 12/707* (2013.01)
*H04L 12/709* (2013.01)
*H04L 12/721* (2013.01)

(52) U.S. Cl.
CPC ............ *H04L 47/125* (2013.01); *H04L 45/00* (2013.01); *H04L 45/16* (2013.01); *H04L 45/24* (2013.01); *H04L 45/245* (2013.01); *H04L 45/66* (2013.01); *Y02B 60/33* (2013.01)

(58) Field of Classification Search
CPC ........................................................ H04L 45/00
USPC ........................................... 370/392; 709/241
See application file for complete search history.

(56) References Cited

U.S. PATENT DOCUMENTS 6,385,201 B1 * 5/2002 Iwata ........................... 370/400
2005/0243713 A1   11/2005 Okuda
(Continued)

FOREIGN PATENT DOCUMENTS

CN        101399737 A     4/2009
JP        2005269314      9/2005
(Continued)

OTHER PUBLICATIONS

Bocci M et al. "Networking high availability for ethernet services using IP/MPLS networks", IEEE Communications Magazine, IEEE Service Center Piscataway, US, vol. 45, No. 3, Mar. 1, 2008 (Mar. 1, 2008) pp. 90-96.z.
(Continued)

*Primary Examiner* — Wei Zhao
(74) *Attorney, Agent, or Firm* — Kramer & Amado, P.C.

(57) ABSTRACT

Various exemplary embodiments relate to a method and related network node including one or more of the following: receiving, at the network node, a packet including a destination address of the packet; resolving the destination address of the packet to a first address of a first receiving node; identifying a second address of a second receiving node as being associated with the first address; and transmitting the packet to both the first address and the second address.

20 Claims, 6 Drawing Sheets

(56) References Cited

U.S. PATENT DOCUMENTS

2007/0268915 A1* 11/2007 Zelig et al. ............... 370/401
2008/0151890 A1   6/2008 Zelig et al.
2008/0298236 A1* 12/2008 Ervin et al. ............... 370/232
2009/0080328 A1*  3/2009 Hu et al. .................. 370/230

FOREIGN PATENT DOCUMENTS

JP    2009522877 A    6/2009
WO    2004102902 A    11/2004

OTHER PUBLICATIONS

Rathgeb, E. P. "The mainStreetXpress 36190: a scalable and highly reliable ATM core services switch" Computer Networks, Elsevier Science Publishers B. V., Amsterdam, NL LNKD-DOI:10.1016/S0169-7552 (98) 00283-9 vol. 31, No. 6, Mar. 25, 1999 (Mar. 25, 1999), pp. 583-601.
IEEE Computer Society, IEEE Standard for Local and Metropolitan area networks, "Link Aggregation", IEEE Std 802.1AX, NY, NY Nov. 2008.
Chinese Office Action dated Nov. 26, 2013; for Application No. 201080037013.6.
Matthew Bocci, Network High availability for ethernet services using IP/MPLS networks, Communications Magazine, IEEE (vol. 46, Issue :3), Mar. 2008, pp. 90-96.
Japanese Office Action dated Aug. 27, 2013.
Japan Office Action dated Mar. 18, 2014; for JP Application No. 2012-525665.
European Communication for EP Application No. 10747372.0 dated Nov. 26, 2015.
JP Re-examination Report dated Mar. 24, 2015.

* cited by examiner

| | 310 | 320 | 330 |
|---|---|---|---|
| | IP Address | MAC Address | TTL |
| 340 | A | U | 21:12:00 |
| 350 | B | U | 09:01:25 |
| 360 | C | U | 00:51:50 |
| 370 | ... | ... | ... |

| | 410 | 420 |
|---|---|---|
| | CLAG Address | Link Addresses |
| 430 | U | {U;V} |
| 440 | W | {W;X;Y} |
| 450 | Z | {Z} |
| 460 | ... | ... |

| | 510 | 520 |
|---|---|---|
| | PLAG Address | CLAG Addresses |
| 530 | U | {U;W;Z} |
| 540 | ... | ... |

SERVER-SIDE LOAD BALANCING USING PARENT-CHILD LINK AGGREGATION GROUPS

RELATED APPLICATIONS

This application is a continuation of application Ser. No. 12/545,680, filed on Aug. 21, 2009, the entire disclosure of which is hereby incorporated herein by reference for all purposes.

TECHNICAL FIELD

Various exemplary embodiments disclosed herein relate generally to the routing of packets in a communications network and the balancing of server load.

BACKGROUND

In many client-server applications, such as IP Television (IPTV), the number of clients requesting a particular service can be quite large. Because any computer has finite processing capability, a server may only provide service to a limited number of clients before the quality of service degrades to unacceptable levels. The most obvious solution, simply providing faster server components, can become prohibitively expensive and technologically impossible as the number of active clients increases. Accordingly, many client-server applications provide multiple redundant servers in order to accommodate all client requests. Various forms of load balancing are then employed to ensure that no single server becomes too bogged down in serving client requests.

In a rudimentary form of load balancing, multiple servers may be provided and the client may simply choose one server to process a request. This can be seen in applications such as file mirroring, where a list of multiple computers serving the requested file are presented to a user, who then simply picks a server to download from. Other information may be provided, such as the current status or geographic location of the server, but the onus is on the user to process this information and make an informed server selection. If the chosen server does not provide the quality of service expected by the client, a different server may be selected.

In another form of server load balancing, a client may send multiple requests to multiple servers and simply accept the first response that arrives, discarding any later arriving responses. Again, this requires more work on the part of the client, as the request must be duplicated and transmitted to multiple addresses. A multicast protocol may be used to send a single request to multiple destinations, but again, this method places the burden on the client, the servers and the network. The server(s) would need to know each client it serves and join a multicast group hosted by the client. This is not practical.

In a more advanced form of load balancing, a central server may arbitrate from which server a client will receive service. According to this method, a client may send its request to a central server which will then determine an appropriate working server to provide service to the client. The central server may then either respond to the client with the address of the assigned working server or hand the initial request directly to the working server. Thus, this method can require the client to perform unnecessary session establishment and exposes the client to at least a portion of the inner workings of the server system. This method may also carry the added disadvantage of leaving server system more vulnerable to attacks such as, for example, a denial of service attack.

Additionally, a central server would have the same limits as any other computing system and may likewise receive too many establishment requests to process efficiently. Thus, in particularly high client volume applications, multiple central servers may be required and the problem becomes recursive. Another form of load balancing must then be implemented in order to ensure that no central server receives more requests than it can efficiently process.

Accordingly, there exists a need for a method of balancing server load between multiple servers without needlessly complicating the methods performed by client devices in requesting a service. Additionally, a need exists for a method to balance server load in a manner that is virtually invisible to client devices.

Another possible point of failure for any network system is in the links connecting network nodes. IEEE 802.1AX, which is incorporated herein by reference, provides for link aggregation groups (LAGs) that combat this possibility. A LAG is made up of multiple links between the same two nodes. When sending a packet over a LAG, a sending node simply selects one of the links that make up the LAG and transmits the packet over one of the selected link. A LAG is given an identifier such as the MAC address of one of its constituent links. In this manner, a packet may be transmitted over one of multiple links toward its destination in a manner that is virtually invisible to all devices other than the two devices at either end of the LAG. If one link fails, packets may still be transmitted over the remaining links in the LAG.

While effective in combating link failure and increasing transfer speeds, LAGs are not useful for many other problems. The operation of a LAG is very simple and not highly customizable. Thus, LAGs are not particularly helpful when devising new and creative methods of fixing network problems and increasing performance. Accordingly, there exists an additional need for a LAG implementation allowing a higher degree of functionality and customization.

The foregoing objects and advantages of the invention are illustrative of those that can be achieved by the various exemplary embodiments and are not intended to be exhaustive or limiting of the possible advantages that can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY

In light of the present need for a method of balancing server load between multiple redundant servers in a manner that is virtually invisible to client devices, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node including one or more of the following: establishing, at the network node, a first Child Link Aggregation Group (CLAG), wherein the first CLAG includes at least one link to a first downstream node; establishing, at the network node, a second CLAG, wherein the second CLAG includes at least one link to a second downstream node; establishing, at the network node, a Parent Link Aggregation Group (PLAG), wherein the PLAG includes the first CLAG and the second CLAG; receiving, at the network node, a packet including an address of a destination of the packet; determining that the destination of the packet is associated with the PLAG; and transmitting the packet over both the first CLAG and the second CLAG.

It should be apparent that, in this manner, various exemplary embodiments enable the routing of any packet to each of a group of servers and the determination of which server should process and/or respond to a received packet. In particular, by sending a packet over every CLAG contained in a PLAG, each server connected to such a CLAG will receive a copy of the packet. Thus, various exemplary embodiments enable the transmission of a packet to multiple servers in a manner that is virtually invisible to the client devices.

BRIEF DESCRIPTION OF THE DRAWINGS

In order to better understand various exemplary embodiments, reference is made to the accompanying drawings, wherein:

FIG. 3 is a schematic diagram of an exemplary data arrangement for storing data related to IP address resolution;

FIG. 4 is a schematic diagram of an exemplary data arrangement for storing Child Link Aggregation Group configurations;

FIG. 5 is a schematic diagram of an exemplary data arrangement for storing Parent Link Aggregation Group configurations;

DETAILED DESCRIPTION

Figure 1:
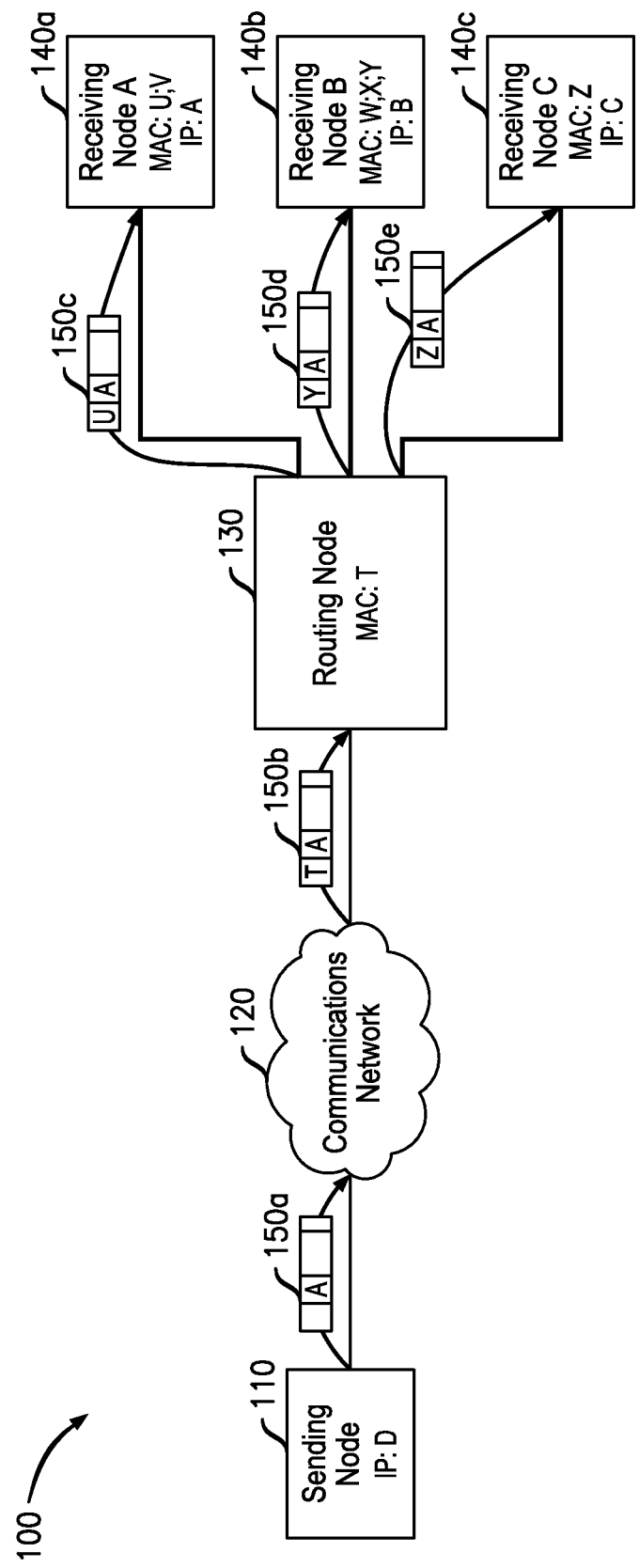
FIG. 1 is a schematic diagram of an exemplary network for routing a unicast or multicast packet to multiple servers.

Referring now to the drawings, in which like numerals refer to like components or steps, there are disclosed broad aspects of various exemplary embodiments. It should be noted that, while various examples utilize letters to signify various network addresses, these letters serve as placeholders and, in actual operation, valid network addresses formed according to appropriate standards would likely be present. In addition, while various embodiments are described herein as routing IP packets specifically, the present disclosure is in no way limited to this protocol.

FIG. 1 is a schematic diagram of an exemplary network 100 for routing a unicast or multicast packet to multiple servers. Exemplary network 100 may include a sending node 110, a communications network 120, a routing node 130, and a number of receiving nodes 140a, 140b, 140c.

Sending node 110 may be a device that communicates with receiving nodes 140a, 140b, 140c. Sending node 110 may, for example, act as a client device and provide a user with access to a service that may be provided by receiving nodes 140a, 140b, 140c. More specifically, in various exemplary embodiments, sending node 110 is a personal or laptop computer, wireless email device, cell phone, television set-top box, or any other device capable of sending a packet to another network device. Sending node 110 may be associated with an IP address, such as "D." Sending node 110 may also be associated with a MAC address.

Communications network 120 may be any network for providing data communications between sending node 110 and router node 130. Communications network 120 may be packet-switched or circuit-switched. Further, communications network 120 may provide, for example, phone and Internet service to various user devices in communication with communications network 120.

Routing node 130 may be a device that receives and retransmits packets according to their destination address. More specifically, in various exemplary embodiments, routing node 130 is a packet router, network switch, multilayer switch, server, or any other device capable of reading an address and forwarding a packet over a port associated with the address. Routing node 130 may be associated with at least one MAC address, "T." While it is likely that routing node 130 is associated with multiple MAC addresses, for simplicity, T will be used herein to refer to any appropriate MAC address of the MAC addresses associated with routing node 130.

Receiving nodes A-C 140a, 140b, 140c may be network devices that communicate with sending node 110. Receiving nodes A-C 140a, 140b, 140c may be server devices that provide a service to user node 110 such as, for example, IP television or file access. More specifically, in various exemplary embodiments, each of receiving nodes A-C 140a, 140b, 140c may be a server, a personal or laptop computer, wireless email device, cell phone, television set-top box, or any other device capable of receiving a packet from another network device.

Receiving node A 140a may be associated with an IP address A and a number of MAC addresses, such as U and V. Receiving node B, 140b may be associated with an IP address B and a number of MAC addresses, such as W, X, and Y. Receiving node C, 140c may be associated with an IP address C and a number of MAC addresses, such as Z. It should be apparent that each of receiving nodes A-C 140a, 140b, 140c, may have any number of network interfaces and thus any number of MAC addresses, including a single MAC address, as is the case with exemplary receiving node C 140c. Receiving nodes A-C 140a, 140b, 140c may include additional network interfaces that are not coupled to routing node 130, but for the purposes of the examples described herein, MAC addresses U, V, W, X, Y, and Z are each associated with network interfaces connected to routing node 130.

Having described the components of network 100, a brief summary of the operation of network 100 will be provided. It should be apparent that the following description is intended to provide an overview of the operation of network 100 and is therefore a simplification in some respects. The detailed operation of network 100 will be described in further detail below in connection with FIGS. 2-5 and 8.

According to various exemplary embodiments, sending node may transmit a packet over communications network 120. The packet may be addressed to IP address A (i.e., the IP address associated with receiving node A 140*a*) and may be carried inside a frame 150*a* to the next device within communications network 120. Routing node 130 may then receive the packet inside a frame 150*b* addressed to MAC address T. In determining over which port the packet should be forwarded, routing node 130 may read the IP address of the packet and consult its configuration to determine how to process the packet. In this example, routing node 130 may determine that it has been configured to transmit packets addressed to IP address A to all three of the receiving nodes 140*a*, 140*b*, 140*c*. Routing node 130 may then select a link over which to transmit the packet to receiving node A 140*a*, a link over which to transmit the packet to receiving node B 140*b*, and a link over which to transmit the packet to receiving node C 140*c*. Finally, routing node 130 may transmit a frame 150*c* to the interface with MAC address U, a frame 150*d* to the interface with MAC address Y, and a frame 150*e* to the interface with MAC address Z.

Thus, the packet sent by sending node 110 to IP address A has been received at each receiving node 140*a*, 140*b*, 140*c* without special action on the part of sending node 110. Receiving nodes 140*a*, 140*b*, 140*c* are now free to determine which, if any, of the receiving nodes 140*a*, 140*b*, 140*c* should respond to the packet. An exemplary method for determining which node should respond to such a packet is described herein with reference to FIGS. 6-7 and 9. The process may be similar for various embodiments that are not specifically tied to IP. In these embodiments, the payload of the frame received by routing node 130, whatever it is, may be transmitted to each of the receiving nodes 140*a*, 140*b*, 140*c*.

Figure 2:
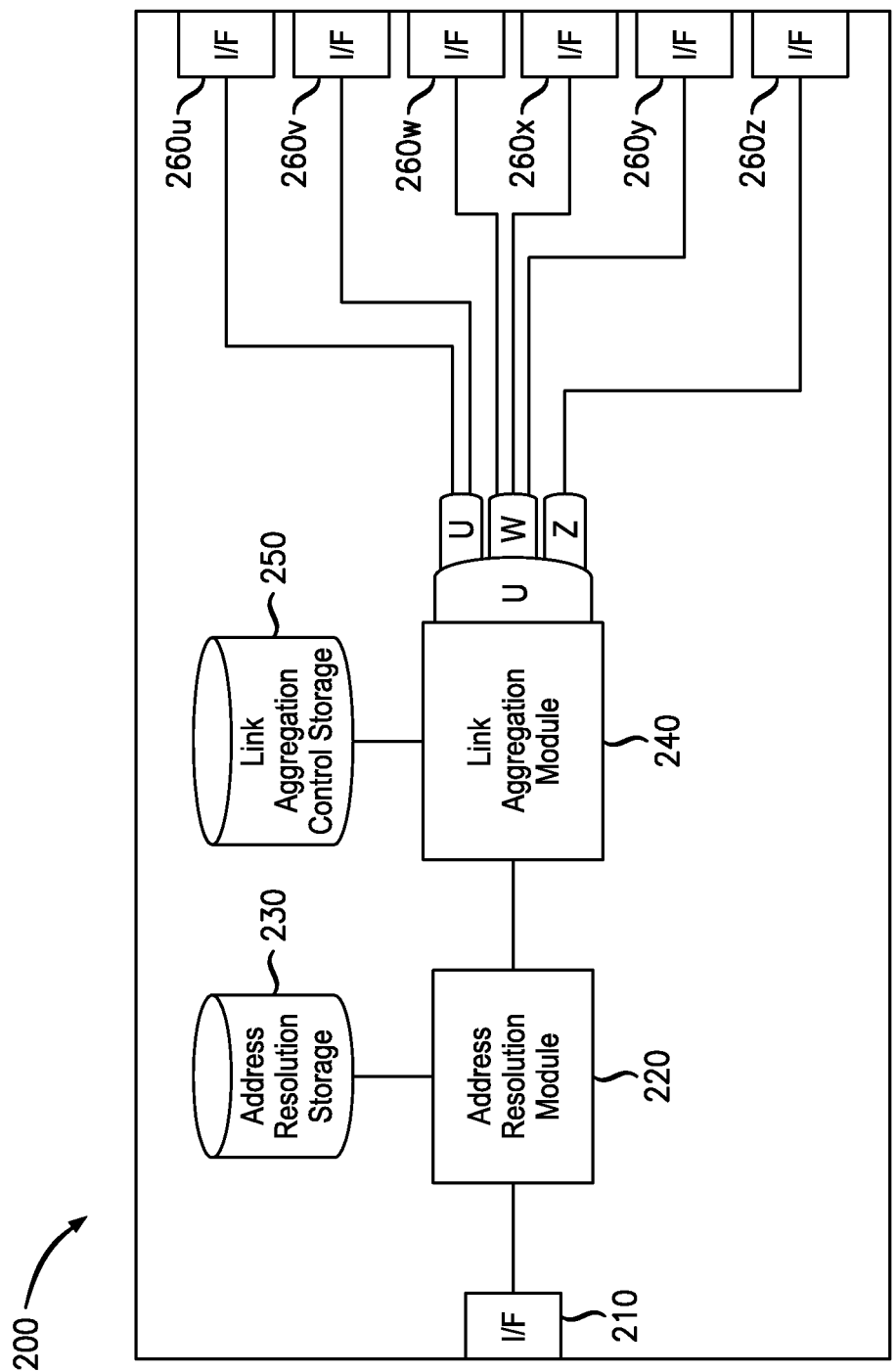
FIG. 2 is a schematic diagram of an exemplary routing node for routing a unicast or multicast packet to multiple servers.

FIG. 2 is a schematic diagram of an exemplary routing node 200 for routing a unicast or multicast packet to multiple servers. Exemplary routing node 200 may correspond to routing node 130 and may include a first interface 210, an address resolution module 220, an address resolution storage 230, a link aggregation module 240, a link aggregation control storage 250, and a plurality of interfaces 260*u-z*.

Interface 210 may be an interface comprising hardware and/or executable instructions encoded on a machine-readable storage medium configured to transmit and receive data over communications network 120. Interface 210 may be coupled to another network device within communications network 120.

Address resolution module 220 may include hardware and/or executable instructions on a machine-readable storage medium configured to determine how to route a packet according to its destination address. For example, address resolution module 220 may receive a packet from interface 210 and read its destination address. Address resolution module 220 may then consult address resolution storage 230 to determine a next-hop address associated with the destination address. Address resolution module 220 may finally pass the packet to link aggregation module 240 so it may forward the packet according to the determined next-hop address.

Address resolution storage 230 may be any machine-readable medium capable of storing associations between destination addresses and identifiers used to route a packet. For example, address resolution storage 230 may be a table implemented according to the Address Resolution Protocol and thus provide associations between IP addresses and MAC addresses. An exemplary embodiment of the data stored in address resolution storage 230 is described in greater detail below with reference to FIG. 3.

Link aggregation module 240 may include hardware and/or executable instructions on a machine-readable storage medium configured to transmit a packet over an appropriate interface 260*u-z*. Link aggregation module 240 may implement at least one Parent Link Aggregation Group (PLAG) and constituent Child Link Aggregation Groups (CLAGs).

A CLAG may be configured to include one or more links to another network node. Each CLAG may be associated with a CLAG identifier. This CLAG identifier may be a unique identifier or it may be an identifier associated with one of the included links, such as its MAC address. In operation, when forwarding a packet over a CLAG, the link aggregation module 240 may select one of the links included in the CLAG and transmit the packet over only the selected link. In this manner, link redundancy is established and if one link in the CLAG fails, the remaining links may be used to communicate with the attached network node.

A PLAG may be configured to include multiple CLAGs. Each CLAG may connect to a different network node or the same network node. A PLAG may be associated with a PLAG identifier which may be a unique identifier or the same as the CLAG identifier for one of the included CLAGs. In operation, when forwarding a packet over a PLAG, the link aggregation module 240 may forward the packet over each constituent CLAG. The packet may then be forwarded according to the normal operation of the constituent CLAGs, as described above. Thus, a packet forwarded over a PLAG will be sent over one link from each constituent CLAG. When each CLAG connects to a different network node, each network node will receive one copy of the packet and can then process it accordingly.

According to the exemplary embodiment in FIG. 2, routing node 200 is configured with one PLAG and three CLAGs. A first CLAG has MAC address U as an identifier and includes interfaces 260*u*, 260*v*. A second CLAG has MAC address W as an identifier and includes interfaces 260*w*, 260*x*, 260*y*. A third CLAG has MAC address Z as an identifier and includes interface 260*z*. The PLAG has MAC address U as an identifier and includes CLAG U, CLAG W, and CLAG Z.

Link aggregation control storage 250 may be any machine-readable medium capable of storing the configuration of various link aggregations groups. Link aggregation control storage 250 may, for example, contain the definitions of all PLAGs and CLAGs configured on routing node 200. Exemplary embodiments of the data stored by link aggregation control storage 250 are described in further detail below with reference to FIGS. 4-5.

Interfaces 260*u-z* may each be an interface comprising hardware and/or executable instructions encoded on a machine-readable storage medium configured to transmit and receive data. Each interface 260*u-z* may be coupled to one of a plurality of network nodes. For example, interfaces 260*u*, 260*v* may be coupled to receiving node A 140*a*; interfaces 260*w*, 260*x*, 260*y* may be coupled to receiving node B 140*b*; and interface 260*z* may be coupled to receiving node C 140*c*.

FIG. 3 is a schematic diagram of an exemplary data arrangement 300 for storing data related to IP address resolution. Data arrangement 300 may be, for example, a table in a database stored in address resolution storage 230. Alternatively, data arrangement 300 could be a series of linked lists, an array, or a similar data structure. Thus, it should be apparent that data arrangement 300 is an abstraction of the underlying data; any data structure suitable for storage of this data may be used.

Data arrangement 300 may include IP address field 310, corresponding MAC address field 320, and time to live (TTL) field 330. IP address field 310 may be used to indicate the IP address to which a particular record corresponds. MAC address field 320 may indicate a MAC address which should be used to route packets to the corresponding IP address. TTL field 330 may indicate when a particular record should be deleted from data arrangement 300.

As an example, record 340 indicates that packets destined for IP address A should be forwarded over the interface associated with MAC address U and that this mapping should live until 21:12:00, at which point record 340 may be deleted. Likewise, record 350 indicates that IP address B also maps to MAC address U and that the mapping should live until 09:01:25. Record 360 indicates that IP address C maps to MAC address U as well and that this mapping should live until 00:51:50. Data arrangement 300 may contain numerous additional records 370.

FIG. 4 is a schematic diagram of an exemplary data arrangement 400 for storing CLAG configurations. Data arrangement 400 may be, for example, a table in a database stored in link aggregation control storage 250. Alternatively, data arrangement 400 could be a series of linked lists, an array, or a similar data structure. Thus, it should be apparent that data arrangement 400 is an abstraction of the underlying data; any data structure suitable for storage of this data may be used.

Data arrangement 400 may include CLAG address field 410 and link addresses field 420. CLAG address field 410 may indicate the CLAG identifier to which a CLAG record corresponds. Link addresses field 420 may indicate the MAC addresses that are associated with a particular CLAG address.

As an example, CLAG record 430 indicates that a CLAG is configured that has MAC address U as an identifier and includes the interfaces associated with MAC addresses U and V. Likewise, CLAG record 440 indicates that a CLAG is configured that has MAC address W as an identifier and includes the interfaces associated with MAC addresses W, X, and Y. Further, CLAG record 450 indicates that a CLAG is configured that has MAC address Z as an identifier and includes the interface associated with MAC address Z. Data arrangement 400 may contain numerous additional CLAG records 460.

FIG. 5 is a schematic diagram of an exemplary data arrangement 500 for storing PLAG configurations. Data arrangement 500 may be, for example, a table in a database stored in link aggregation control storage 250. Alternatively, data arrangement 500 could be a series of linked lists, an array, or a similar data structure. Thus, it should be apparent that data arrangement 500 is an abstraction of the underlying data; any data structure suitable for storage of this data may be used.

Data arrangement 500 may include PLAG address field 510 and CLAG addresses field 520. PLAG address field 510 may indicate the PLAG identifier to which a PLAG record corresponds. CLAG addresses field 520 may indicate the CLAG identifiers that are associated with a particular PLAG address.

As an example, PLAG record 530 indicates that a PLAG is configured that has MAC address U as an identifier and includes the CLAGs identified by MAC addresses U, W, and Z. Data arrangement 500 may contain numerous additional PLAG records 540.

Figures 6, 7:
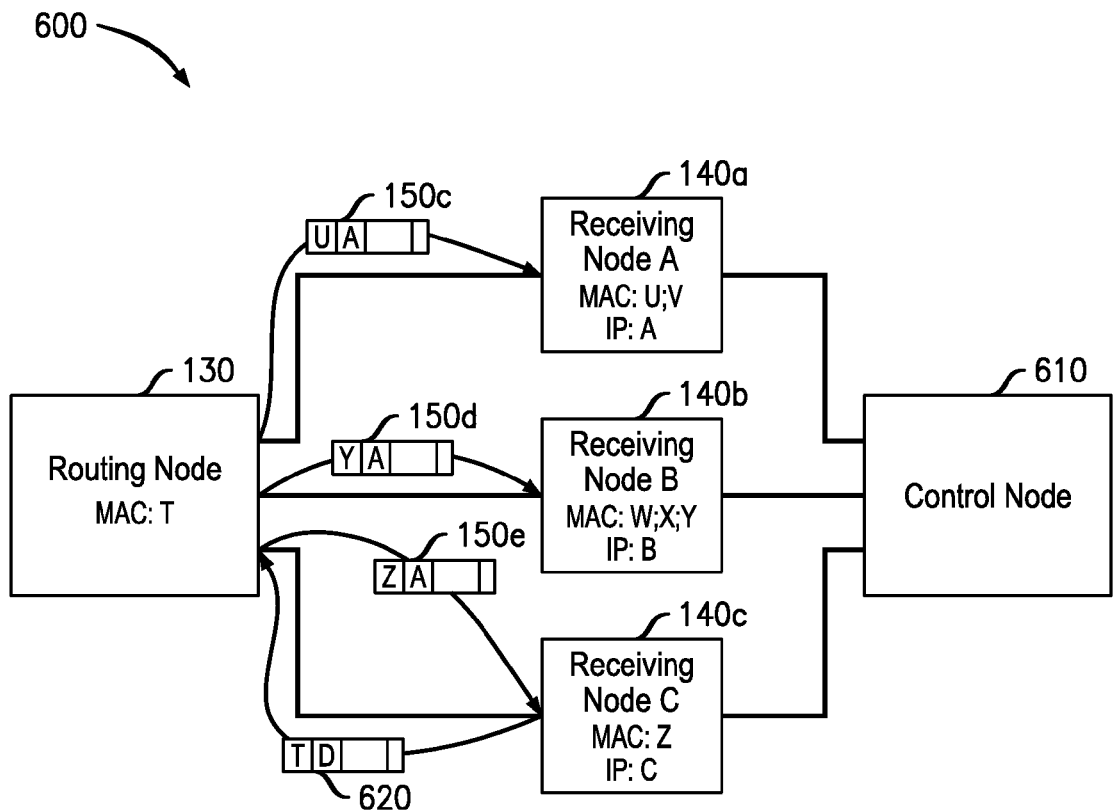
FIG. 6 is a schematic diagram of an exemplary network for performing load balancing between multiple servers.
FIG. 7 is a schematic diagram of an exemplary data arrangement for storing an indexed list of currently active servers.

FIG. 6 is a schematic diagram of an exemplary network 600 for performing load balancing between multiple servers 140a, 140b, 140c. Exemplary network 600 may include routing node 130, receiving nodes A-C 140A, 140B, 140C, and control node 610.

Control node 610 may be a network device capable of keeping receiving nodes 140a, 140b, 140c up-to-date as to which receiving nodes 140a, 140b, 140c are active. More specifically, in various exemplary embodiments, control node 610 may be a server, a personal or laptop computer, wireless email device, cell phone, television set top box, or any other device capable of communicating with each receiving node 140a, 140b, 140c. Control node 610 may maintain a list of active receiving nodes 140a, 140b, 140c and periodically communicate this list to receiving nodes 140a, 140b, 140c. Alternatively, control node 610 may only send messages to receiving nodes 140a, 140b, 140c when a receiving node 140a, 140b, 140c becomes active or inactive and receiving nodes 140a, 140b, 140c may then update locally-stored active server lists accordingly. As a further alternative, control node 610 may not be present at all and receiving nodes 140a, 140b, 140c may maintain local active server lists through periodic communications with each other.

Receiving nodes 140a, 140b, 140c may all implement an algorithm that uses a list of the currently active receiving nodes 140a, 140b, 140c to determine whether or not to process a received packet and respond accordingly. Thus, assuming each receiving node 140a, 140b, 140c contains a reference to all three receiving nodes 140a, 140b, 140c in their currently active server list, when receiving node A 140a receives frame 150c, it may use the common algorithm to determine that receiving node C 140c should respond to the packet. Accordingly, receiving node A 140a may ignore the packet. Likewise, when receiving node B 140b receives frame 150d, it may determine that receiving node C 140c should respond to the packet and ignore the packet as well. When receiving node C 140c receives frame 150e, it may determine that, according to the algorithm, it should process the packet and respond accordingly. Receiving node C 140c may therefore send a response packet addressed to IP address D (i.e., the IP address of sending node 110) and encapsulate it in a frame 620 addressed to MAC address T.

FIG. 7 is a schematic diagram of an exemplary data arrangement 700 for storing an indexed list of currently active servers. Data arrangement 700 may be, for example, a table in a database stored in one of the receiving nodes 140a, 140b, 140c. Alternatively, data arrangement 700 could be a series of linked lists, an array, or a similar data structure. Thus, it should be apparent that data arrangement 700 is an abstraction of the underlying data; any data structure suitable for storage of this data may be used.

Data arrangement 700 may include an index field 710 and a server ID field 720. Index field 710 may simply include a number corresponding to a specific record. Records may be accessed by specifying the index of the desired record. Server ID field 720 may include an identifier for one of the receiving nodes 140a, 140b, 140c. The identifier may be, for example, an IP address associated with the referenced receiving node 140a, 140b, 140c.

As an example, server record 730 may be indexed by the number zero and identify the node at IP address A (i.e., receiving node A 140a) as an active server. Likewise, server record 740 may be indexed by the number one and identify the node at IP address B (i.e., receiving node B 140b) as an active server. Server record 750 may be indexed by the number two and identify the node at IP address C (i.e., receiving node C 140c) as an active server. Data arrangement 700 may contain numerous additional records 760.

Figure 8:
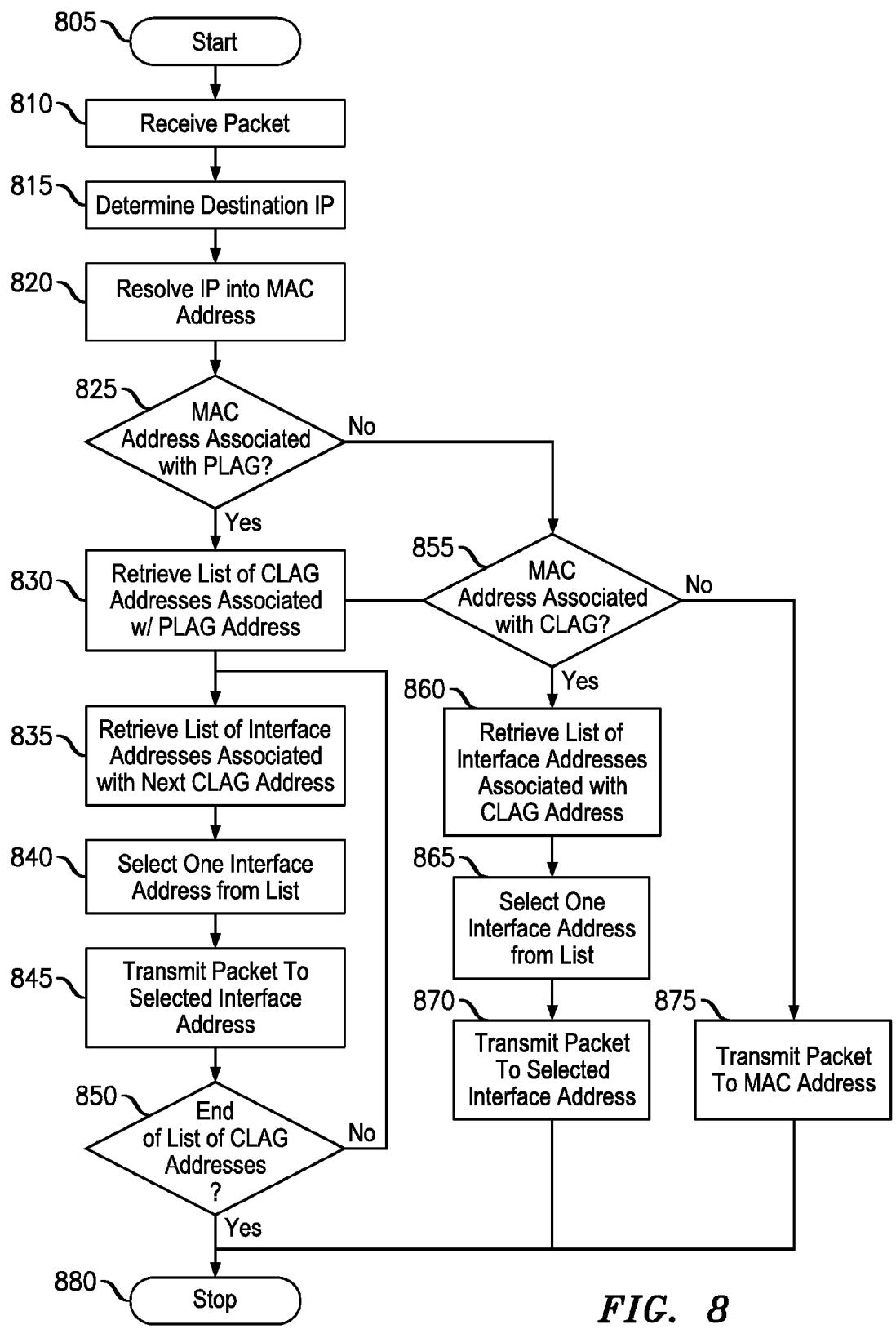
FIG. 8 is a flowchart of an exemplary method for routing a unicast or multicast packet to multiple servers.

FIG. 8 is a flowchart of an exemplary method 800 for routing a unicast or multicast packet to multiple servers. Method 800 may be performed by the components of routing node 130 to forward a packet to each of the receiving nodes 140a, 140b, 140c.

Method 800 starts in step 805 and proceeds to step 810, where routing node 130 receives a packet. Routing node 130 may then determine the destination IP address of the packet and resolve the destination IP address into an appropriate MAC address over which to forward the packet in steps 815 and 820, respectively. For example, routing node 130 may consult an address resolution storage 230 to determine a MAC address associated with the destination IP address. After determining an appropriate MAC address for forwarding the packet, routing node 130 may determine whether the MAC address is associated with a PLAG in step 825.

If the MAC address identifies a PLAG, method 800 may proceed to step 830, where routing node 130 may retrieve a list of CLAGs associated with the PLAG by, for example, accessing a PLAG record associated with the PLAG address in a link aggregation control storage 250. Routing node 130 may then retrieve a list of links associated with the first CLAG in the list of CLAGs at step 835 by, for example, accessing a CLAG record associated with the first constituent CLAG from a link aggregation control storage 250. Routing node 130 may then select one link from the list of links for the CLAG and transmit the packet to the selected link in steps 840 and 845, respectively. Method 800 may then proceed to step 850, where routing node 140 may determine whether it has reached the end of the list of CLAG addresses. If it has not, method 800 may return to step 835 where routing node 140 may repeat steps 835-850 for the next CLAG in the list. If the end of the list has been reached, method 800 may stop in step 880. In this manner, one copy of the received packet may be sent over each CLAG.

If it is determined at step 825 that the MAC address does not identify a PLAG, method 800 may move to step 855, where routing node 130 may determine whether the MAC address is instead associated with a CLAG. If so, routing node 130 may retrieve a list of links associated with the CLAG, select one link from the list, and transmit the packet to the selected link in steps 860, 865, and 870, respectively. Method 800 may then stop in step 880. In this manner, the routing node 130 may implement standard link aggregation functionality in addition to PLAG functionality.

If routing node 130 determines at step 855 that the MAC address is not associated with a CLAG, routing node 130 may assume that the packet may be routed according to standard operation. Method 800 may proceed to step 875 where routing node 130 may transmit the packet to the MAC address associated with the destination IP address and then stop in step 880.

Figure 9:
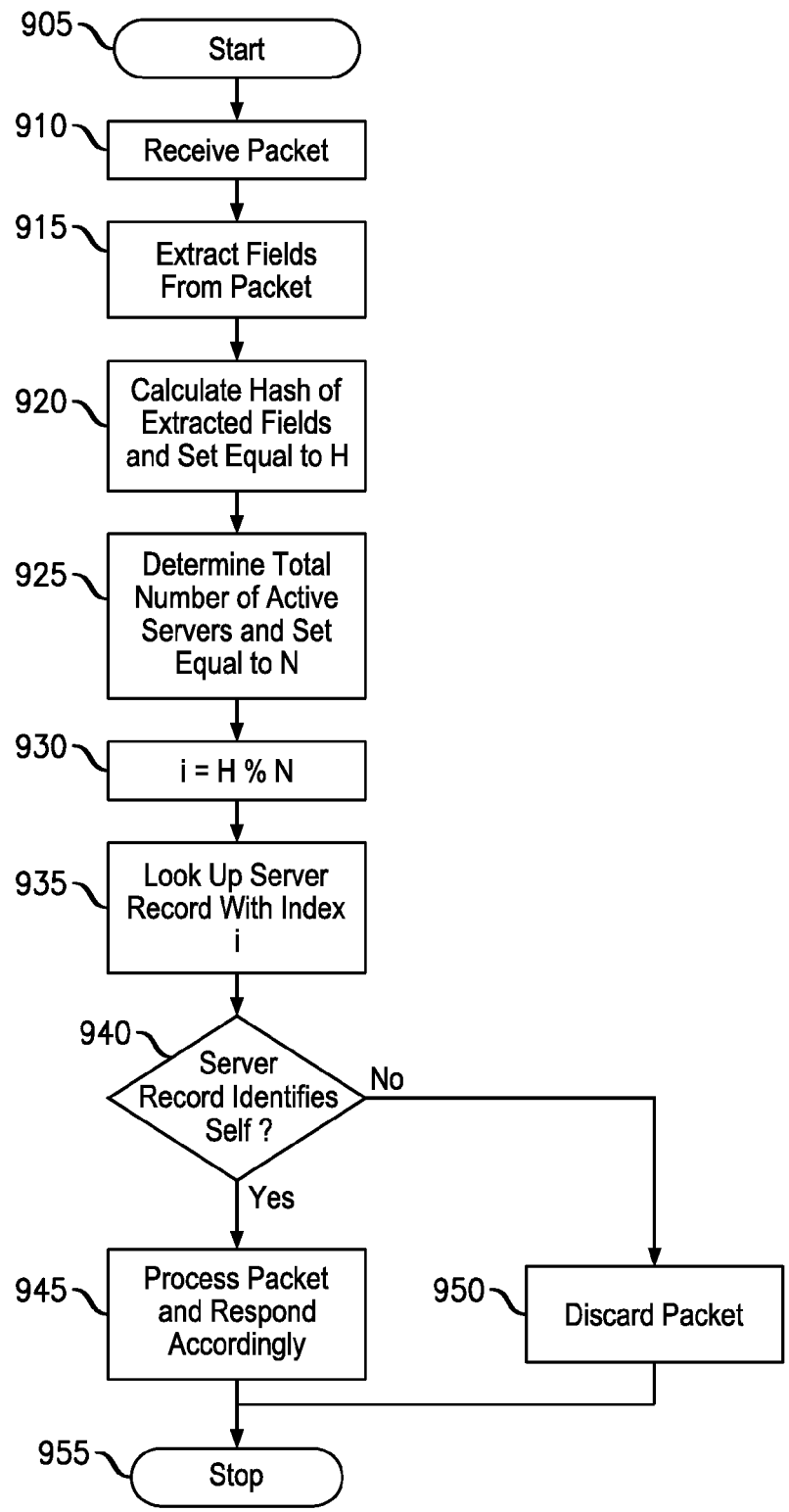
FIG. 9 is a flowchart of an exemplary method for performing load balancing between multiple servers.

FIG. 9 is a flowchart of an exemplary method 900 for performing load balancing between multiple servers. Method 900 may be performed independently by the components of each of the receiving nodes 140a, 140b, 140c, to determine whether to process a received packet and respond accordingly.

Method 900 may start in step 905 and proceed to step 910, where the receiving node 140a, 140b, 140c may receive a packet that has been sent to all receiving nodes 140a, 140b, 140c. The receiving node 140a, 140b, 140c may then extract a number of fields and other information from the packet at step 915. The extracted information may include, for example, the source IP address or the type of service request. Method 900 may then proceed to step 920, where the receiving node 140a, 140b, 140c may calculate a hash value from the extracted fields using any method known to those of skill in the art. In step 925, receiving node 140a, 140b, 140c may then determine how many total receiving nodes 140a, 140b, 140c are currently active by, for example, consulting a locally-stored active server list.

Receiving node 140a, 140b, 140c may then calculate an index value using the hash value and the total number of servers at step 930. For example, receiving node 140a, 140b, 140c may perform a modulo operation on the hash function using the total number of active servers. It should be apparent that in this manner, an index value is obtained having a value between zero and the total number of active servers minus 1, inclusive. Receiving node 140a, 140b, 140c may then, in step 935, access an item in the list of active servers associated with the calculated index.

In step 940, receiving node 140a, 140b, 140c will determine whether the accessed item identifies itself or another receiving node 140a, 140b, 140c. If the receiving node 140a, 140b, 140c determines that the accessed item identifies itself, method 900 may proceed to step 945 where the receiving node 140a, 140b, 140c may process the received packet and respond accordingly. For example, if the received packet was a request for a change of channel in an IPTV system, the receiving node 140a, 140b, 140c may respond by transmitting a new channel to sending node 110. Method 900 may then stop at step 955. If, on the other hand, receiving node 140a, 140b, 140c determines in step 940 that the accessed item identifies a different receiving node 140a, 140b, 140c, it may simply ignore the packet in step 950 and method 900 may then stop in step 955. In should be apparent that, in the manner described above, only one of the receiving nodes 140a, 140b, 140c will process and respond to each received packet.

Having described exemplary components and methods for the operation of exemplary networks 100, 600, an example of the operation of exemplary networks 100, 600 will now be provided with reference to FIGS. 1-9.

The address resolution storage 230 of routing node 130 may be indicated by data arrangement 300. The link aggregation control storage 250 of routing node 130 may be indicated by data arrangements 400, 500. Control node 610 may currently be monitoring the status of receiving nodes 140a, 140b, 140c and transmit a list indicating all receiving nodes 140a, 140b, 140c as currently active to each of the receiving nodes 140a, 140b, 140c. Accordingly, each receiving node 140a, 140b, 140c may currently contain a list of active servers as indicated by data arrangement 700.

The process may begin with sending node 110 transmitting a packet with destination IP address A over communications network 120 inside frame 150a. Routing node 130 may receive the packet inside frame 150b. Address resolution module 220 of routing node 130 may then determine that the destination IP address of the packet is A. By accessing record 340 in address resolution storage, address resolution module 220 may determine that IP address A is associated with MAC address U. The packet may then be passed to link aggregation module 240 which may determine that MAC address U is associated with a PLAG. By accessing PLAG record 530 contained in link aggregation control storage 250, link aggregation module 240 may determine that PLAG U contains CLAG U, CLAG W, and CLAG Z.

Link aggregation module 240 may then access CLAG record 430 and determine that interface addresses U and V are contained by CLAG U. Link aggregation module 240 may then select interface address U and transmit the packet in frame 150c to receiving node A 140a via interface 260u. Moving on to CLAG W, link aggregation module may access CLAG record 440 and select interface address Y from the resulting list of three interface addresses associated with CLAG W. Link aggregation module 240 may then transmit the packet in frame 150d to receiving node B 140b via interface 260y. Finally, link aggregation module may access record 450, select interface address Z from the list of interface addresses associated with CLAG Z, and transmit the packet in frame 150e to receiving node C 140c via interface 260z.

After receiving the packet, each receiving node 140a, 140b, 140c may determine whether to respond to the packet by first extracting the source IP address and the request type from the packet. For example, the source IP address may be D and the type of request may be a request for a specific file. Using this information, each receiving node 140a, 140b, 140c may calculate a hash value from the extracted values, such as, for example, "0x4F31." Each receiving node 140a, 140b, 140c may then determine how many servers are currently active by, for example, counting the number of records in data arrangement 700. In this example, the total number of active servers is three. Each receiving server may then obtain a calculated index of two by performing a modulo operation on the hash value using the total number of active servers, three.

Each receiving node may then retrieve server record 750, i.e. the server record having an index of two. Receiving node A and B 140a, 140b may both determine that this server record does not identify themselves and thus may simply discard the packet. Receiving node C 140c, on the other hand, may recognize this server record as identifying itself and create a response packet addressed to IP address D. Receiving node C 140c may then transmit the response packet to sending node 100 within frame 220.

According to the foregoing, various exemplary embodiments provide for balancing server load between multiple servers in a manner that is virtually invisible to clients. In particular, by implementing a Parent Link Aggregation Group including multiple Child Link Aggregation Groups, any packet can be forwarded at Layer 2 to multiple servers at the end of each CLAG. Further, by implementing a selection algorithm across all of the servers, the servers can quickly and efficiently determine one server that should process the packet.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of routing packets in a communications network by a network node, the method comprising:
   receiving, at the network node, a packet including a destination address of the packet;
   resolving the destination address of the packet to a first address of a first receiving node;
   identifying a second address of a second receiving node as being associated with the first address; and
   transmitting the packet to both the first address and the second address.

2. The method of claim 1, wherein:
   a third address of the second receiving node is additionally associated with the first address, and
   transmitting the packet comprises transmitting the packet to both the first address and the second address and refraining from transmitting the packet to the third address.

3. The method of claim 1, further comprising identifying a third address of a third receiving node as being associated with the first address,
   wherein transmitting the packet comprises transmitting the packet the first address, the second address, and the third address.

4. The method of claim 1, wherein the first address belongs to a first link aggregation group (LAG) and the second address belongs to a second LAG.

5. The method of claim 1, wherein identifying the second address comprises:
   identifying a parent link aggregation group (PLAG) identified by the first address; and
   identifying a child link aggregation group (CLAG) that belongs to the PLAG, wherein the second address belongs to the CLAG.

6. The method of claim 5, wherein identifying the CLAG comprises:
   identifying a member address that belongs to the PLAG, and
   identifying the CLAG as being identified by the member address.

7. The method of claim 1, further comprising:
   receiving the packet at the first receiving node;
   determining, by the first receiving node, that the packet is associated with a link aggregation group;
   determining, based on at least a portion of the packet, whether the first receiving node should process the packet; and
   if the first receiving node should not process the packet, discarding the packet.

8. A non-transitory machine-readable medium encoded with instructions for performing the method of claim 1.

9. A method of routing packets in a communications network by a network node, the method comprising:
   receiving a packet at the network node;
   determining that the packet is associated with a link aggregation group, wherein the link aggregation group includes a plurality of links;
   transmitting the packet over a first link of the plurality of links associated with the link aggregation group; and
   transmitting the packet over a second link of the plurality of links associated with the link aggregation group.

10. The method of claim 8, wherein the link aggregation group is a parent link aggregation group that contains a plurality of child link aggregation groups.

11. The method of claim 10, wherein
a first child link aggregation group of the plurality of child link aggregation groups includes the first link, and
a second child link aggregation group of the plurality of child link aggregation groups includes the second link.

12. The method of claim 11 further comprising, for each child link aggregation group of the plurality of child link aggregation groups, transmitting the packet over a member link of the child link aggregation group.

13. The method of claim 11, wherein the first link aggregation group includes a third link, the method further comprising refraining from transmitting the packet over the third link.

14. The method of claim 11, wherein the parent link aggregation group and the first child link aggregation group both utilize an address associated with the first link as a link aggregation group address.

15. A non-transitory machine-readable medium encoded with instructions for performing the method of claim 11.

16. A method performed by a receiving node for handling a received packet, the method comprising:
  receiving a packet at the receiving node;
  determining that the packet is associated with a link aggregation group;
  determining, based on at least a portion of the packet, whether the receiving node should process the packet; and
  if the receiving node should not process the packet, discarding the packet.

17. The method of claim 16, wherein determining whether the receiving node should process the packet comprises:
  determining a total number of receiving nodes associated with the link aggregation group;
  deriving a piece of information from the packet;
  performing a mathematical operation with respect to the piece of information and the total number of receiving nodes to obtain a result index;
  determining whether the result index corresponds to the receiving node; and
  determining that the receiving node should not process the packet based on the result index not corresponding to the receiving node.

18. The method of claim 16, wherein the mathematical operation comprises performing a modulo operation on the piece of information using the total number of receiving nodes.

19. The method of claim 16, wherein deriving the piece of information comprises:
  extracting a set of information from the packet; and
  computing a hash value based on the set of information.

20. A non-transitory machine-readable medium encoded with instructions for performing the method of claim 16.

* * * * *